(12) United States Patent
Andreopoulos et al.

(10) Patent No.: US 9,672,593 B2
(45) Date of Patent: Jun. 6, 2017

(54) LENS DISTORTION CORRECTION USING A NEUROSYNAPTIC SYSTEM

(71) Applicant: International Business Machines Corporation, Armonk, NY (US)

(72) Inventors: Alexander Andreopoulos, San Jose, CA (US); Daniel F. Gruhl, San Jose, CA (US); Michael Karasick, White Plains, NY (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 14/315,303

(22) Filed: Jun. 25, 2014

(65) Prior Publication Data

US 2015/0379689 A1   Dec. 31, 2015

(51) Int. Cl.
| | | |
|---|---|---|
| *G06T 3/40* | (2006.01) | |
| *G06T 5/00* | (2006.01) | |
| *G06K 9/66* | (2006.01) | |
| *G06K 9/46* | (2006.01) | |

(52) U.S. Cl.
CPC ............ *G06T 3/4046* (2013.01); *G06T 5/006* (2013.01); *G06K 9/4604* (2013.01); *G06K 9/66* (2013.01); *G06T 2207/20084* (2013.01)

(58) Field of Classification Search
CPC ................... G06T 3/4046; G06T 5/006; G06T 2207/20084; G06K 9/4604; G06K 9/66; G06N 3/02; G06N 3/0454; G06N 3/06; G06N 3/063; G06N 3/049
See application file for complete search history.

(56) References Cited

U.S. PATENT DOCUMENTS

| | | | |
|---|---|---|---|
| 5,625,378 A | * | 4/1997 | Wan ..................... H04N 1/6019 345/600 |
| 6,243,131 B1 | | 6/2001 | Martin |
| 2006/0256227 A1 | | 11/2006 | Gotzig |

(Continued)

OTHER PUBLICATIONS

Esser, Steve K., Alexander Andreopoulos, Rathinakumar Appuswamy, Pallab Datta, Davis Barch, Arnon Amir, John Arthur et al. "Cognitive computing systems: Algorithms and applications for networks of neurosynaptic cores." In Neural Networks (IJCNN), The 2013 International Joint Conference on, pp. 1-10. IEEE, 2013.*

(Continued)

*Primary Examiner* — Sumati Lefkowitz
*Assistant Examiner* — Carol Wang
(74) *Attorney, Agent, or Firm* — Sherman IP LLP; Kenneth L. Sherman; Steven Laut

(57) ABSTRACT

Embodiments of the invention provide a system and circuit for image distortion correction. The system includes neurosynaptic core circuits that: receive a set of inputs comprising image dimensions and pixel distortion coefficients for one or more image frames via one or more input core circuits, map each distorted pixel to zero or more undistorted pixels by processing the set of inputs corresponding to each pixel of the one or more image frames by the one or more input core circuits, and route corresponding pixel intensity values of each distorted pixel to output undistorted pixels for each image frame via one or more output core circuits.

8 Claims, 14 Drawing Sheets

(56) References Cited

U.S. PATENT DOCUMENTS

| | | | | |
|---|---|---|---|---|
| 2008/0097155 | A1* | 4/2008 | Gattani | A61B 1/00039 600/117 |
| 2010/0214472 | A1* | 8/2010 | Tomonaga | G06T 3/4053 348/441 |
| 2014/0016858 | A1* | 1/2014 | Richert | G06K 9/62 382/156 |
| 2014/0219497 | A1* | 8/2014 | Richert | G06K 9/36 382/103 |
| 2015/0139537 | A1* | 5/2015 | Milner | G06K 9/4604 382/156 |

OTHER PUBLICATIONS

Vogelstein, R. Jacob, Udayan Mallik, Eugenio Culurciello, Gert Cauwenberghs, and Ralph Etienne-Cummings. "A multichip neuromorphic system for spike-based visual information processing." Neural computation 19, No. 9 (2007): 2281-2300.*

Brauer-Burchardt, C., "A new methodology for determination and correction of lens distortion in 3D measuring systems using fringe projection", Proceedings of the 27th DAGM conference on Pattern Recognition (PR'05), 2 Sep. 2005, pp. 200-207, ACM, United States.

Granger, G. et al., "Camera Linearity Test Struccture", Aug. 1, 1992, Motorola Inc., pp. 1-3, vol. 16, IP.com, United States.

Baker, R.G. et al., "Camera Lens Changing Machanism", Dec. 1, 1993, IBM Technical Disclosure Bulletin, p. 1-5, vol. 36, No, 12, IP.com, United States.

Brauer-Burchardt, C., "Correcting lens distortion in 3D measuring systems using fringe projection", Proceedings of the SPIE 5962, Optical Design and Engineering II, Sep. 12, 2005, pp. 1-11, SPIE Digital Library, United States.

Daloukas, K. et al., "Implementation of a Wide-Angle Lens Distortion Correction Algorithm on the Cell Broadband Engine", Proceedings of the 23rd International Conference on Supercomputing (ICS'09), Jun. 8-12, 2009, pp. 4-13, ACM, United States.

Brauer-Burchardt, C., "A new methodology for determination and correction of lens distortion in 3D measuring systems using fringe projection". Proceedings of the 27th DAGM conference on Pattern Recognition (PR'05), Sep. 2, 2005, pp. 200-207, ACM, United States (Abstract Only).

Wikipedia, "Distortion (optics)", last modified May 16, 2014, pp. 1-7, en.wikipedia.org/wiki/Distortion_%28optics%29, downloaded Jun. 25, 2014, USA.

Ojanen, H., "Automatic Correction of Lens Distortion by Using Digital Image Processing", Jul. 10, 1999, pp. 1-6, Pre-print downloaded from http://www.math.rutgers.edu/~ojanen/undistort/undistort.pdf, USA.

Cave Projects, "Catadioptric Cameras for 360 Degree Imaging", pp. 1-3, Computer Vision Library, Dept. of Computer Science, Columbia University, downloaded Jun. 25, 2014 from http://www.cs.columbia.edu/CAVE/projects/cat_cam_360/, USA.

List of IBM Patents or Applications Treated as Related.

* cited by examiner

LENS DISTORTION CORRECTION USING A NEUROSYNAPTIC SYSTEM

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computational systems, and in particular, image distortion correction using a neuromorphic and synaptronic computational system.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

In one embodiment, the present invention provides a system and circuit for image distortion correction. The system includes neurosynaptic core circuits that: receive a set of inputs comprising image dimensions and pixel distortion coefficients for one or more image frames via one or more input core circuits, map each distorted pixel to zero or more undistorted pixels by processing the set of inputs corresponding to each pixel of the one or more image frames by the one or more input core circuits, and route corresponding pixel intensity values of each distorted pixel to output undistorted pixels for each image frame via one or more output core circuits. In one embodiment, the present invention further provides for sharpening the resulting undistorted image.

These and other features, aspects, and advantages of the present invention will become understood with reference to the following description, appended claims, and accompanying figures.

DETAILED DESCRIPTION

The present invention relates to neuromorphic and synaptronic computation, and in particular, imaging correction through programmatic inverse distortion using a neurosynaptic system.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

Figure 1:
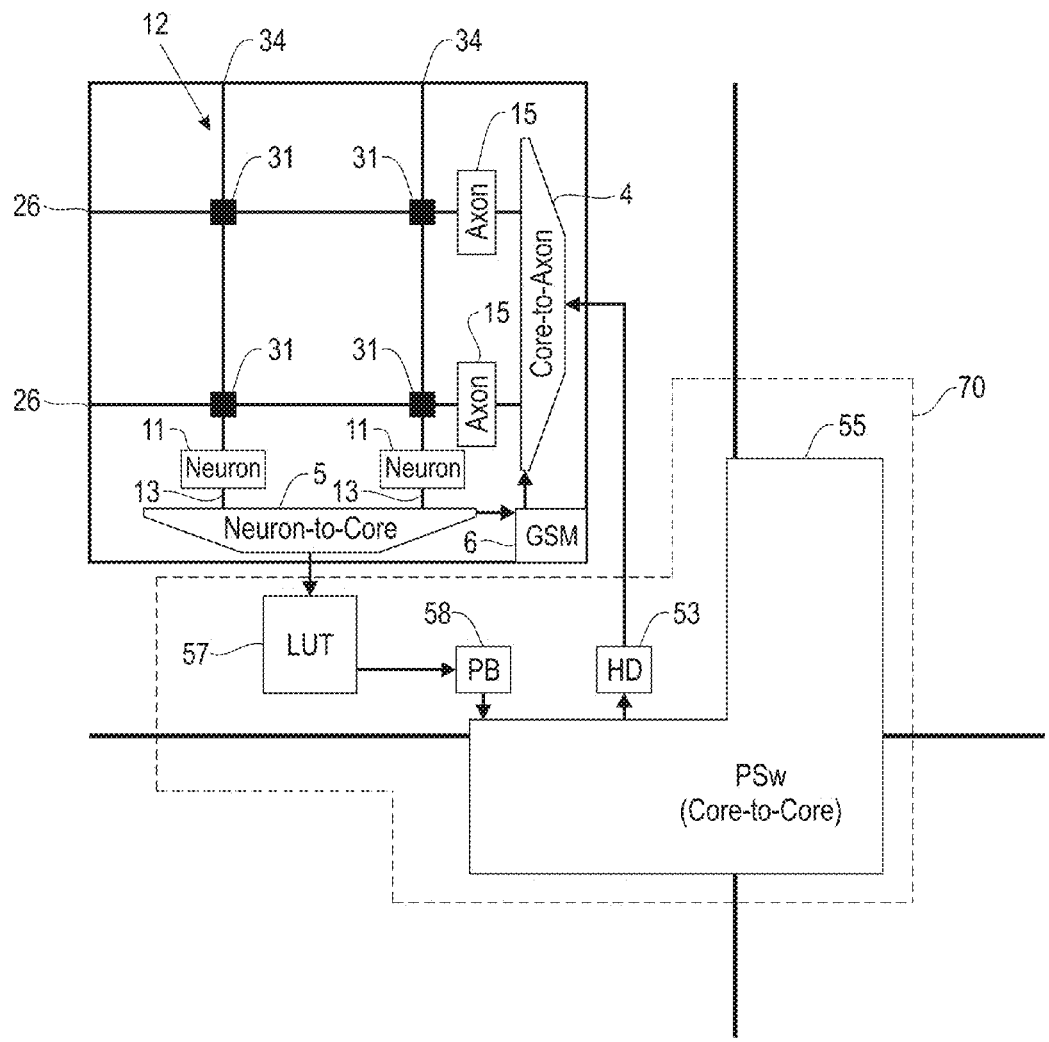
FIG. 1 illustrates an example neurosynaptic core circuit ("core circuit"), in accordance with an embodiment of the invention.

FIG. 1 illustrates an example neurosynaptic core circuit ("core circuit") 10, in accordance with an embodiment of the invention. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "×" represents multiplication, and m and n are positive integers.

Each synapse 31 communicates firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends firing events to the connected axon path 26. Each neuron 11 is connected to a dendrite path 34, and receives firing events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the firing events received, each neuron 11 generates a firing event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives firing events and transmits them to target axons 15. The address-event transmitter 5 transmits firing events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises a routing fabric 70. The routing fabric 70 is configured to selectively route neuronal firing events among core circuits 10. The routing fabric 70 comprises a firing events address lookup table (LUT) module 57, a packet builder (PB) module 58, a head delete (HD) module 53, and a core-to-core packet switch (PSw) 55. The LUT 57 is an N address routing table is configured to determine target axons 15 for firing events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The coreto-core PSw 55 is also configured to receive incoming address-event packets from the core circuits 10. The HD 53 removes routing information from an incoming address-event packet to deliver it as a time stamped firing event to the address-event receiver 4.

In one example implementation, the core circuit 10 may comprise 256 neurons 11. The crossbar 12 may be a 256× 256 ultra-dense crossbar array that has a pitch in the range of about 0.1 nm to 10 μm. The LUT 57 of the core circuit 10 may comprise 256 address entries, each entry of length 32 bits.

In one embodiment, soft-wiring in the core circuit 10 is implemented using address events (e.g., Address-Event Representation (AER)). Firing event (i.e., spike event) arrival times included in address events may be deterministic or non-deterministic.

Although certain illustrative embodiments of the invention are described herein using synapses comprising electronic circuits, the present invention is not limited to electronic circuits.

Figure 2:
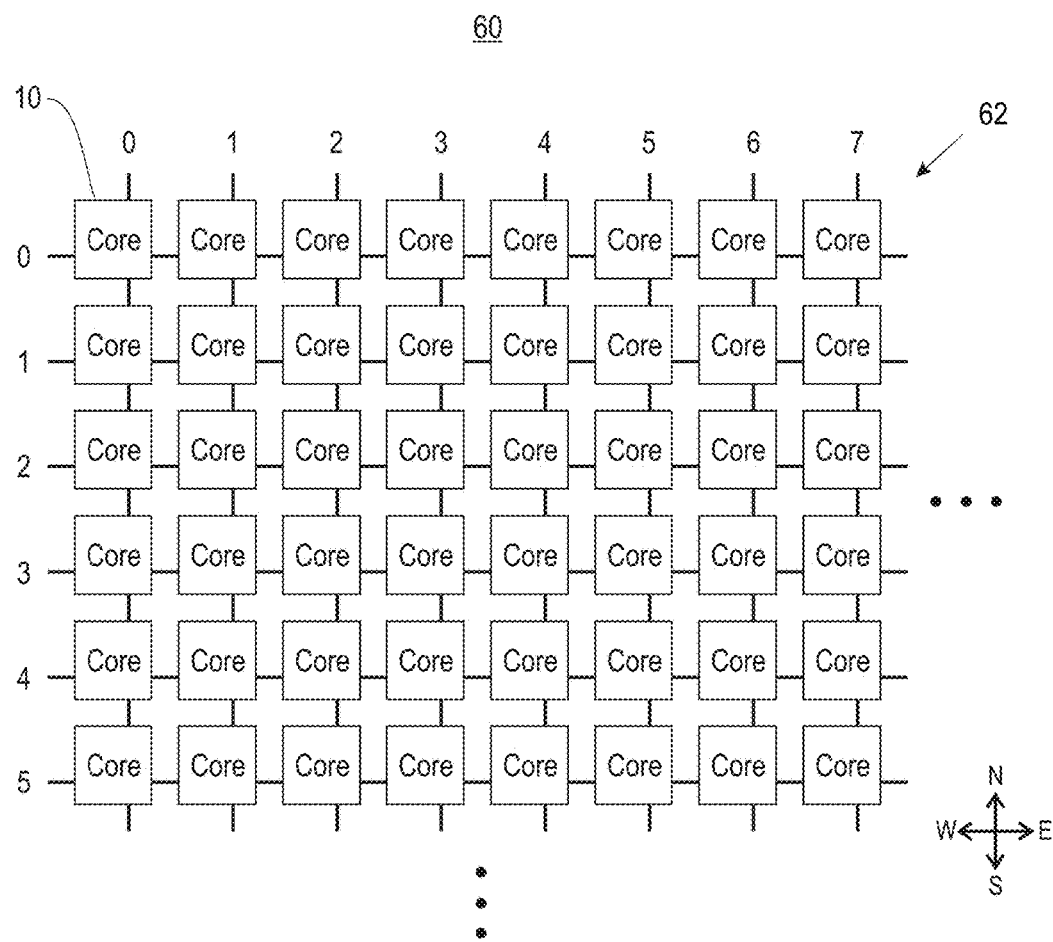
FIG. 2 illustrates an example neurosynaptic network circuit, in accordance with an embodiment of the invention.

FIG. 2 illustrates an example neurosynaptic network circuit 60, in accordance with an embodiment of the invention. The network circuit 60 is an example multi-core neurosynaptic system comprising multiple interconnected core circuits 10. In one embodiment, the core circuits 10 are arranged as a two-dimensional tile-able core array 62. Each core circuit 10 may be identified by its Cartesian coordinates as core (i, j), where i is a row index and j is a column index of the core array 62 (i.e., core (0,0), core (0,1), . . . , core (5,7)).

Each core circuit 10 utilizes its core-to-core PSw 55 (FIG. 1) to pass along neuronal firing events in the eastbound, westbound, northbound, or southbound direction. For example, a neuron 11 (FIG. 1) of the core circuit (0,0) may generate a firing event targeting an incoming axon 15 (FIG. 1) of the core circuit (5,7). To reach the core circuit (5,7), the firing event may traverse seven core circuits 10 in the eastbound direction (i.e., from core (0,0) to cores (0,1), (0,2), (0,3), (0,4), (0,5), (0,6), and (0,7)), and five core circuits 10 in the southbound direction (i.e., from core (0,7) to cores (1, 7), (2, 7), (3, 7), (4, 7), and (5, 7)) via the core-to-core PSws 55 of the network circuit 60.

Figure 3:
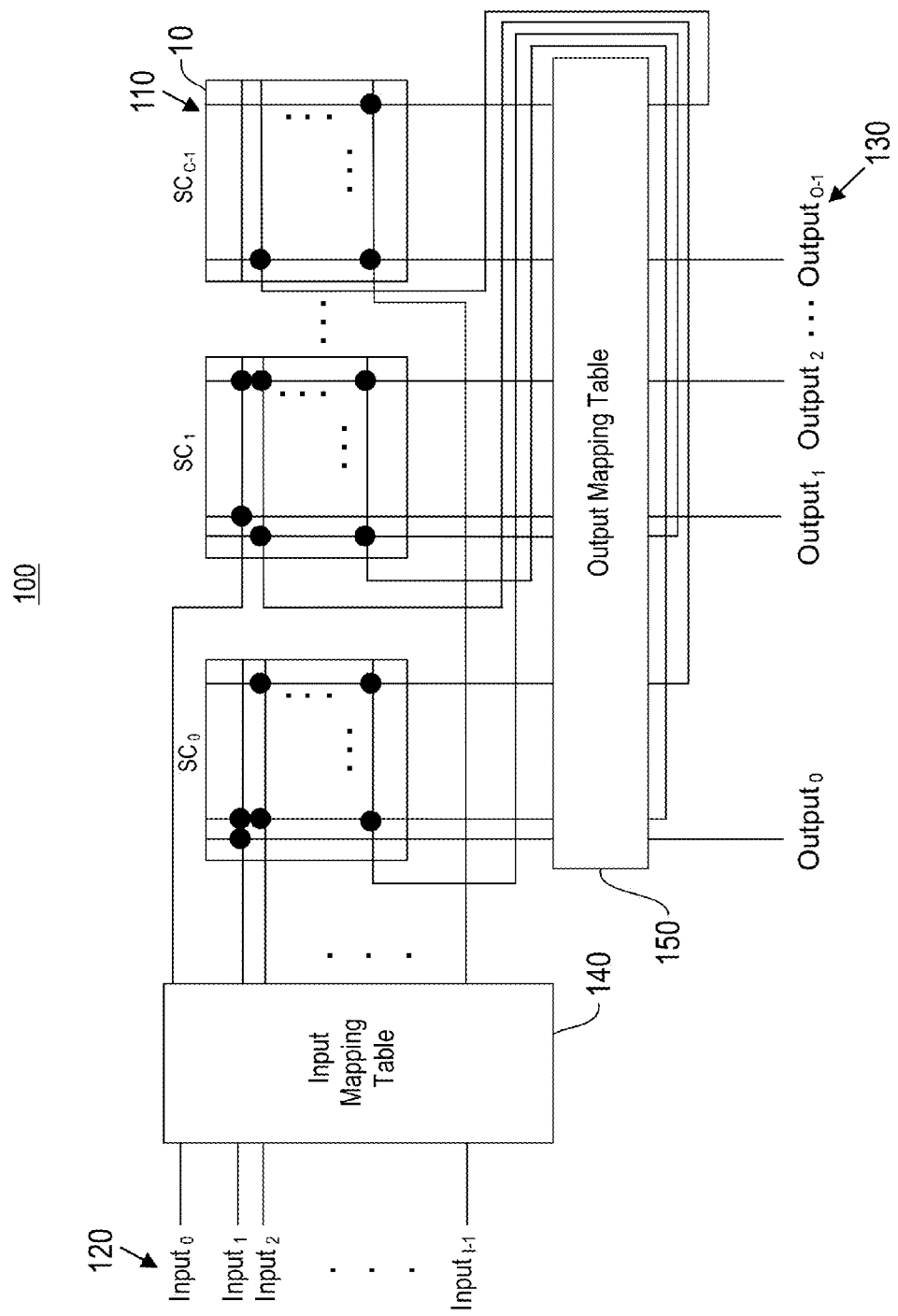
FIG. 3 illustrates an example corelet for at least one core circuit, in accordance with an embodiment of the invention.

FIG. 3 illustrates an example corelet 100 for at least one core circuit 10, in accordance with an embodiment of the invention. A corelet 100 is a structural description of one or more core circuits 10. Corelets 100 are applicable to different types of neural core circuits. In one embodiment, a corelet 100 is a static configuration file for programming a portion (i.e., a fraction) of a core circuit 10 or an entire core circuit 10. Corelets 100 may also be composed in a hierarchical fashion, such that a corelet 100 may be used to program two or more corelets 100 representing multiple interconnected core circuits 10.

A corelet 100 may program the neuronal activity of one or more core circuits 10 of the neural network circuit 60. For example, a corelet 100 may be used to program the routing fabric 70 of a core circuit 10. Other examples of activities a corelet 100 may program a core circuit 10 to perform include edge detection in image/video, motion history tracking in video, object classification, sense-response in a robotic environment, sound filtering, etc.

Each corelet 100 comprises C constituent units ("constituent sub-corelets") 110, wherein C is an integer greater than or equal to one. Each sub-corelet 110 defines one of the following: a portion (i.e., a fraction) of a core circuit 10, an entire core circuit 10, or a corelet 100 that in turn defines multiple interconnected core circuits 10. For example, as shown in FIG. 3, each sub-corelet 110 represents a core circuit 10.

All sub-corelets 110 of the corelet 100 are numbered. For example, each sub-corelet 110 may be identified by a corresponding index $SC_i$, wherein $0 \leq i \leq C-1$.

The corelet 100 receives I inputs 120, wherein I is an integer greater than or equal to one. Each input 120 may represent a firing event from another corelet 100 or an input from an external system, such as sensory input from an external sensory system. All inputs 120 received by the corelet 100 are addressed. For example, each input 120 may be addressed by a corresponding index $Input_j$, wherein $0 \leq j \leq I-1$.

The corelet 100 generates O outputs 130, wherein O is an integer greater than or equal to one. Each output 130 may represent a firing event generated by a neuron 11 of a sub-corelet 110. Each output 130 may be routed to another corelet 100 or an external system, such as an external motor system. All outputs 130 generated by the corelet 100 are addressed. For example, each output 130 may be addressed by a corresponding index $Output_k$, wherein $0 \leq k \leq O-1$.

The corelet 100 further comprises an input mapping table 140 and an output mapping table 150. In one embodiment, each table 140, 150 is a routing table that maintains routing information. As described in detail later herein, the input mapping table 140 maintains routing information for each input 120 received by the corelet 100. Based on the input mapping table 140, each received input 120 is mapped to an input of a sub-corelet 110 within the corelet 100. If each sub-corelet 110 is a core circuit 10, each received input 120 is mapped to a target incoming axon 15. If each sub-corelet 110 is a corelet 100, each received input 120 is mapped to an input 120 of a corelet 100.

The output mapping table 150 maintains routing information for each output generated by each sub-corelet 110 of the corelet 100. If a sub-corelet 110 is a core circuit 10, the output generated by the sub-corelet 110 is a firing event. If a sub-corelet 110 is a corelet 100, the output generated by the sub-corelet 110 is an output 130. Based on the output mapping table 150, each output generated by a sub-corelet 110 is mapped to one of the following: an input of a sub-corelet 110 within the corelet 100 (e.g., a target incoming axon 15, or an input 120 of a corelet 100), or an output 130 of the corelet 100. As stated above, each output 130 is routed to another corelet 100.

The example corelet 100 shown in FIG. 3 comprises three sub-corelets 110, wherein each sub-corelet 110 represents a core circuit 10. In one embodiment, each core circuit 10 comprises a 256×256 ultra-dense crossbar 12 (FIG. 1) of synapses 31 (FIG. 1) that interconnects 256 neurons 11 (FIG. 1) with 256 incoming axons 15 (FIG. 1). At maximum, the corelet 100 in FIG. 3 has about 768 (i.e., 256×3) inputs 120 and about 768 (i.e., 256×3) outputs 130. The number of inputs 120 and the number of outputs 130 may be less, depending on the interconnections between the sub-corelets 110 as determined by the input mapping table 140 and the output mapping table 150.

Figure 4:
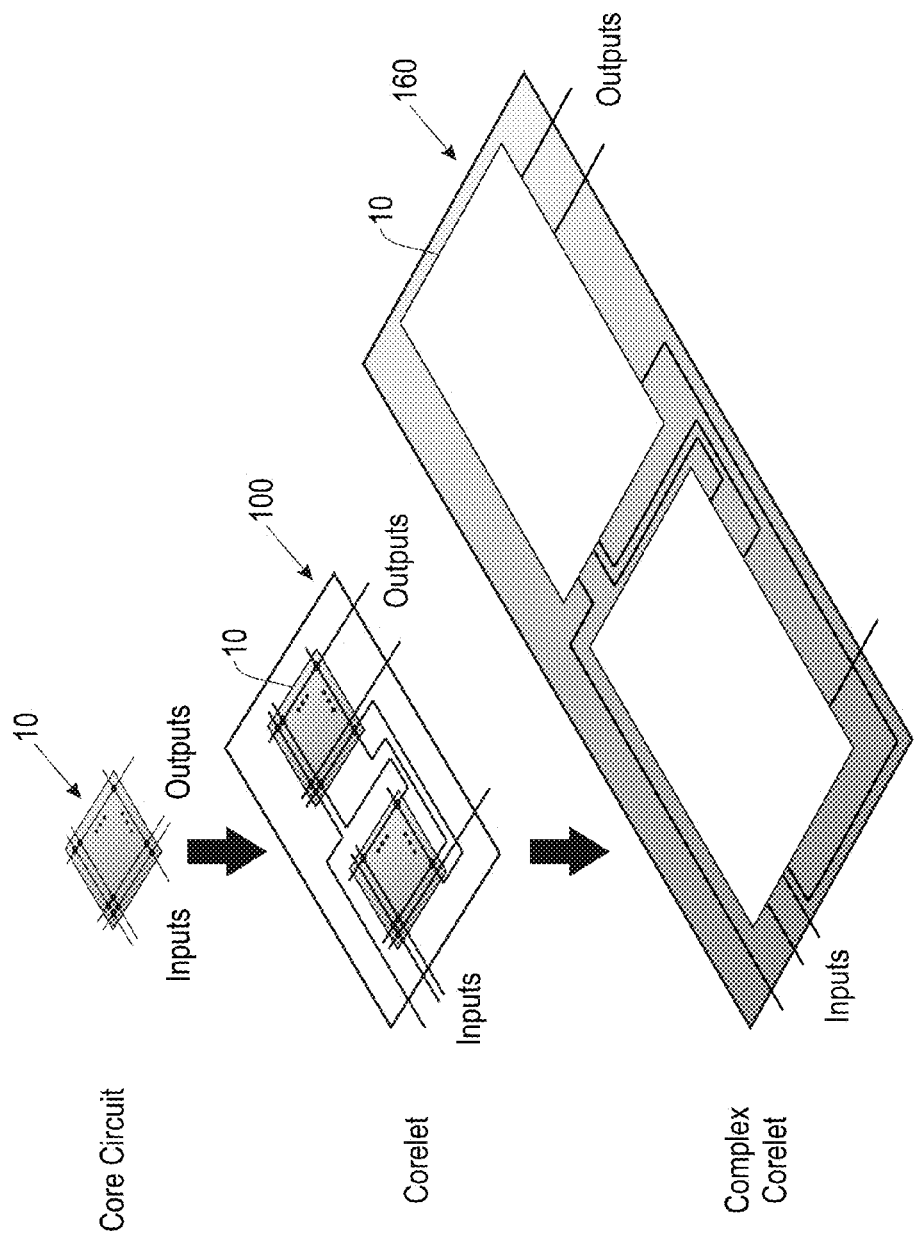
FIG. 4 illustrates a hierarchical composition of corelets, in accordance with an embodiment of the invention.

FIG. 4 illustrates a hierarchical composition of corelets 100, in accordance with an embodiment of the invention. Each corelet 100 is modular, reusable, and scalable. Corelets 100 may be combined to form a corelet 100. In one embodiment, a complex corelet 160 is a corelet 100 that is composed of at least two corelets 100. Complex corelets 160 are used to program multiple corelets 100 representing multiple interconnected core circuits 10.

In one embodiment, a neurosynaptic system configured using corelets (e.g., corelets 100, FIG. 3) may be used to correct distorted images (e.g., video images, still images, series of still images, etc.) captured from an image sensor or camera device.

With lower prices for imaging integrated circuits (ICs) (e.g., charge coupled device (CCD), cell phone camera type, etc.) the major expense in portable or closed-circuit television (CCTV) camera systems shifts to the optics. A problem in image quality due to inexpensive optics may arise when the camera lens is not perfectly spherical, or when a multi-lens system has a misalignment. Additionally, most lens systems perform fairly well at particular distances or in certain parts of the visual field, but often distort somewhat at certain distances or around the edges. These distortions all fall into the realm where correction through programmatic inverse distortion of the image is a possible option. Traditionally, however, these approaches are expensive either in terms of hardware, power, or data transmission resources. One embodiment of the invention leverages the low per chip cost and low power requirements of a neurosynaptic network circuit (e.g., neurosynaptic network circuit 60) IC to move the inverse distortion forward into the camera or image capturing device itself, and providing the downstream systems with the effect of a higher quality camera system without the expense of better optics.

Figure 5A:
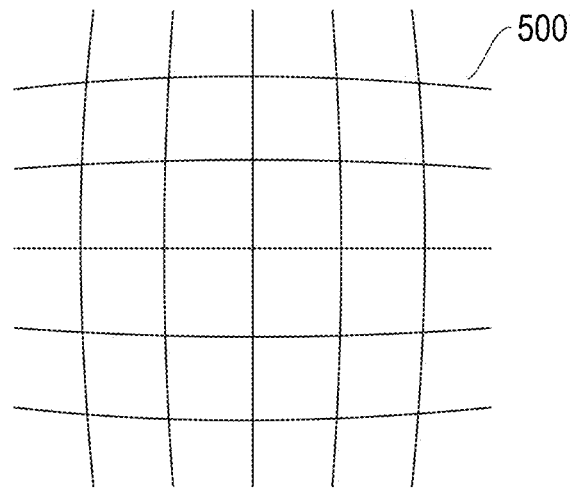
FIG. 5A illustrates an example of barrel or radial distortion.
Figure 5B:
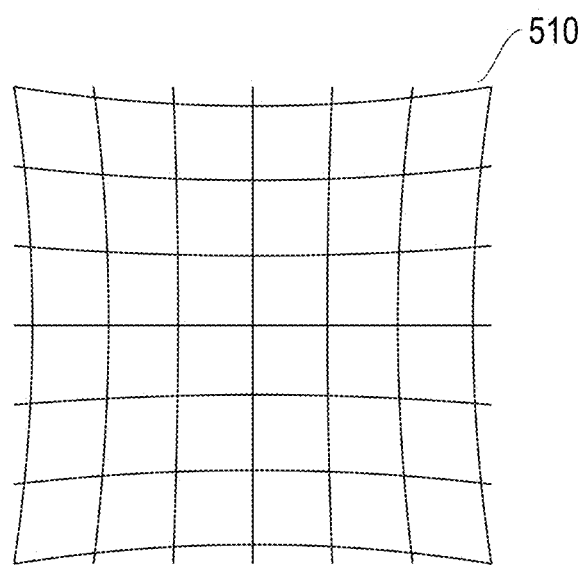
FIG. 5B illustrates an example of pincushion or tangential distortion.
Figure 5C:
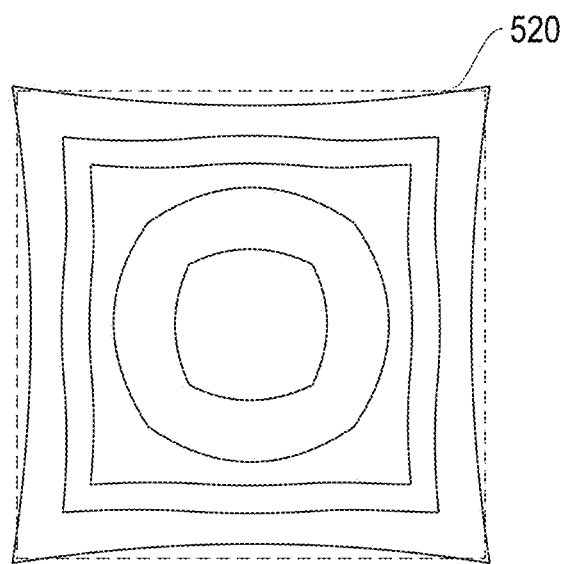
FIG. 5C illustrates an example of combined barrel and pincushion distortions.

For imaging, such as imaging using an image capturing device or camera device, there are two main types of distortions associated with inexpensive camera lenses. The two main types of distortions are known as barrel (or radial) distortion and pincushion (or tangential) distortion. FIG. 5A illustrates an example of barrel distortion 500. Barrel distortions are caused by wide angle lenses, which cause straight lines to curve outwards. FIG. 5B illustrates an example of pincushion distortion 510. Pincushion distortion is often caused by telephoto or zoom lenses and results in straight lines curving inwards. In imaging, often both types of distortions (barrel distortion 500 and pincushion distortion 510) appear simultaneously. FIG. 5C illustrates an example of combined barrel and pincushion distortions (or moustache distortion) 520. As a result of the lens distortions, the modeling of these deformations may be achieved by a set of equations known in the art as the Brown distortion model (Brown, Duane C. (May 1966), "Decentering distortion of lenses," Photogrammetric Engineering. 32 (3): 444-462).

Brown's model corrects both for barrel (radial) distortion and for pincushion (tangential) distortion caused by physical elements in a lens not being perfectly aligned. The latter is also known as decentering distortion. Brown's model is provided below:

$$x_u=(x_d-x_c)(1+K_1r^2+K_2r^4+\ldots)+(P_1(r^2+2(x_d-x_c)^2)+2P_2(x_d-x_c)(y_d-y_c))(1+P_3r^2+P_4r^4\ldots)$$

$$y_u=(y_d-y_c)(1+K_1r^2+K_2r^4+\ldots)+(P_2(r^2+2(y_d-y_c)^2)+2P_1(x_d-x_c)(y_d-y_c))(1+P_3r^2+P_4r^4\ldots)$$

where:

($x_d$, $y_d$)=distorted image point as projected on image plane using specified lens, ($x_u$, $y_u$)=undistorted image point as projected by an ideal pin-hole camera, ($x_c$, $y_c$)=distortion center (assumed to be the principal point), $K_n$=$n^{th}$ radial distortion coefficient, $P_n$=$n^{th}$ tangential distortion coefficient, $r=\sqrt{(x_d-x_c)^2+(y_d-y_c)^2}$, and . . . =an infinite series.

Barrel distortion typically will have a positive term for $K_1$ whereas pincushion distortion will have a negative value. The combined distortion 520 (moustache distortion) will have a non-monotonic radial geometric series where for some r the sequence will change sign.

In one or more embodiments, inverse distortion or undistorting an image includes:

1. Estimating the distortion coefficients that define an analytic equation by mapping every distorted pixel (x, y) to an undistorted coordinate (x', y') (note that the undistorted coordinate may lie between pixels). In the description that follows, this is referred to as the forward modeling.

2. Using the above analytic expression to perform the backward modeling. In one embodiment, for every undistorted pixel (x, y) the intensity of the corresponding distorted pixel is estimated. In one embodiment, the undistorted pixels are expressed in integer coordinates. As a result, an "inverse" of the forward distortion equation is needed. In one embodiment, this inverse function that is modeled using a neurosynaptic network circuit (e.g., neurosynaptic network circuit 60) or TrueNorth IC.

In one embodiment, a high order polynomial equation is used to approximate Brown's distortion model, and optimization (e.g., Levenberg-Marquardt optimization) in Matlab is used to determine the optimal parameters of the polynomial equation. In one embodiment, every undistorted pixel (x, y) of an image that is located at a Euclidean distance r from the principal point is mapped to a distorted pixel r+D(r), where $D(r)=c_2r^2+c_3r^3+\ldots$ is the high-order polynomial mapping the distortion, where $c_n$ are scale factors, n being an integer. In one embodiment, given the distortion coefficients for Brown's distortion model, a number of evenly distributed points mapping distorted pixels to undistorted coordinates are determined and the optimization is used to determine the optimal coefficients of D(r).

Figure 6:
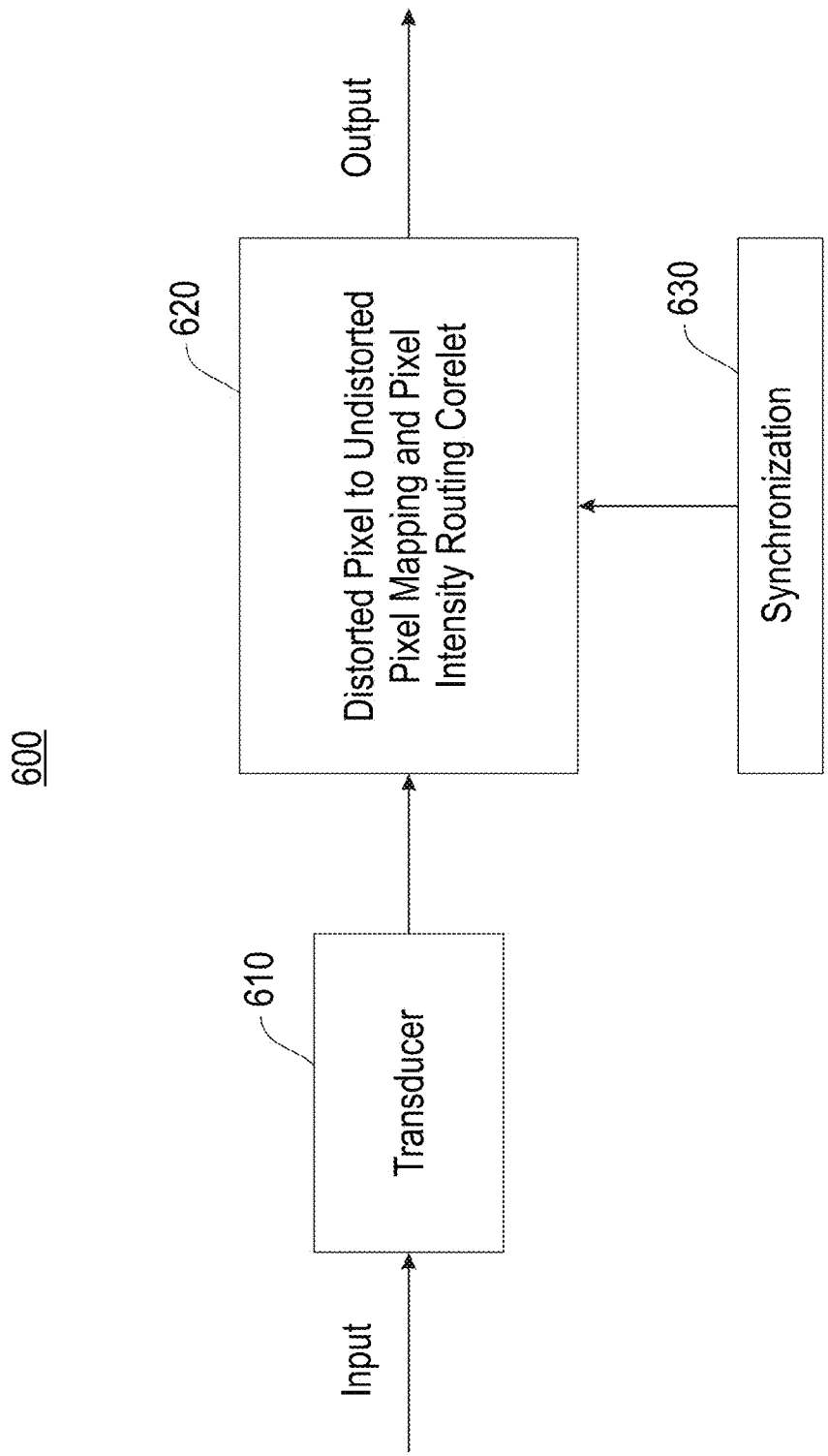
FIG. 6 illustrates an example image distortion correction system, in accordance with an embodiment of the invention.

FIG. 6 illustrates an example image correction system 600, in accordance with an embodiment of the invention. The image correction system 600 corrects distorted pixels from, for example, an input video stream comprising a sequence of image frames, or a still image frame. In one embodiment, the image correction system 600 comprises a transducer unit 610, a distorted pixel to undistorted pixel and pixel intensity routing corelet 620, and an optional synchronization unit 630. In one embodiment, synchronization neurons may be used in the optional synchronization unit for bilinear interpolation, while an embodiment that uses nearest neighbor interpolation does not need the synchronization unit 630 with synchronization neurons. In one embodiment, the optional synchronization unit with a set of synchronization neurons may be used to gate the input. That is, in one embodiment a neural "AND" gate is placed at the front of the corelet 620 such that the synchronization neurons indicate which input frames to suppress (e.g., suppress every second input frame, etc.). In one example embodiment, suppressing frames is useful if the input frame rate is higher than the desired output frame rate. In general synchronization neurons may be useful in one or more embodiments if, for example, a designer desires to include another neural preprocessing module in front of the camera. In one embodiment, the corelet 620 also takes as input the dimensions of the image desired to correct distortion, as well as the coefficients of D(r), and uses them to map each pixel in the undistorted image to the nearest distorted pixel. In one embodiment, each distorted pixel may be routed to zero or more undistorted pixels of the undistorted image plane using the corelet 620. In one embodiment, the output results are used to provide an undistorted image.

Figure 7:
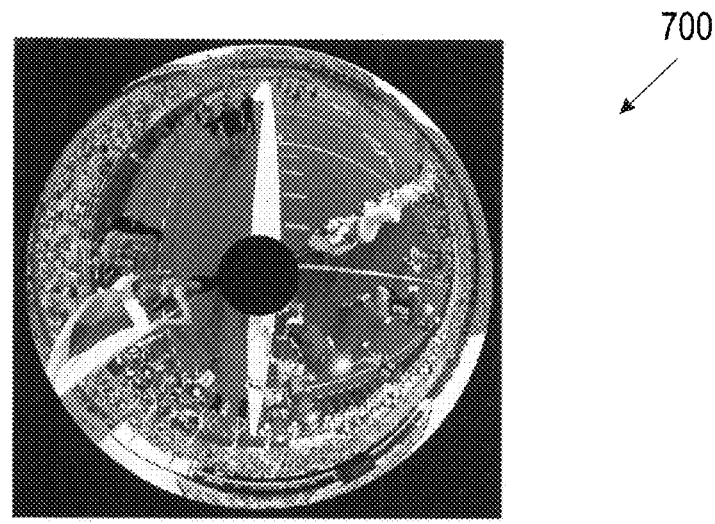
FIG. 7 illustrates an example catadioptric image.

FIG. 7 illustrates an example catadioptric image 700 shown for educational purposes. Nearest neighbor interpolation is extremely cheap (neuron-wise) but offers low quality images under extreme camera deformations. Bilinear interpolation is more expensive (neuron-wise) but provides better interpolation, especially under extreme camera deformations or for non-projective cameras such as catadioptric cameras for 360 degree viewing.

An algorithm that may be used for bilinear interpolation in accordance with one or more embodiments is described as follows. In one example, assume the intensity of an image is known as f(x,y) at 4 points (0,0), (0,1),(1,0) and (1,1). In bilinear interpolation, linear combinations of the intensities f(0,0),f(0,1),f(1,0),f(1,1) are used to approximate the intensity for any coordinate 0≤x≤1, 0≤y≤1. In other words f(x,y)≈(1−x)(1−y)f(0,0)+(x)(1−y)f(1,0)+(1−x)(y)f(0,1)+(x)(y)f(1,1).

Figure 8:
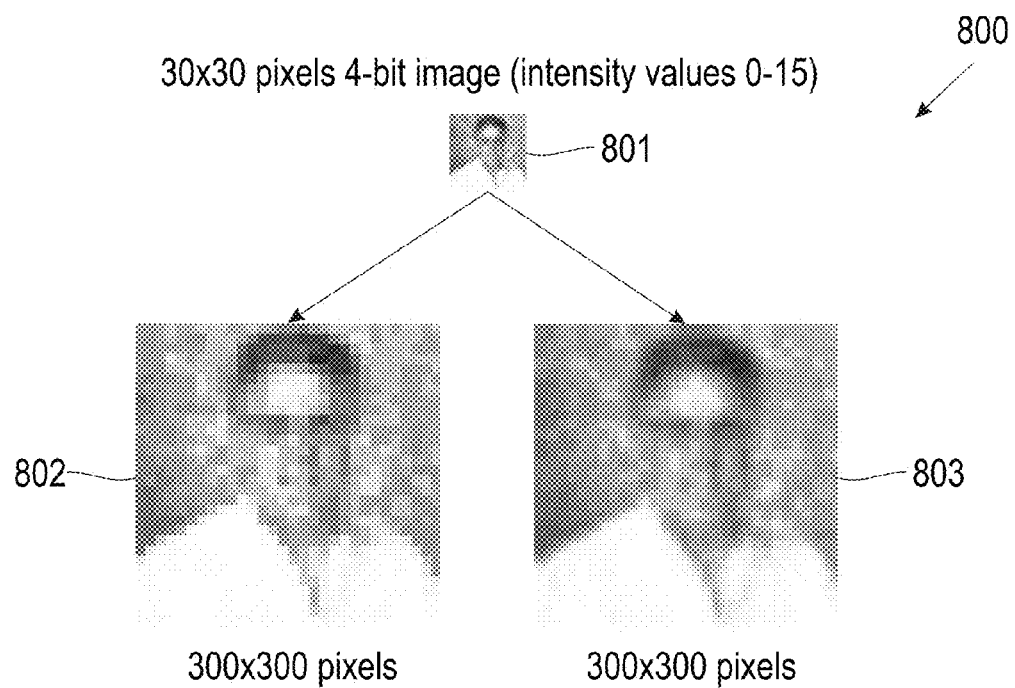
FIG. 8 illustrates a comparison of upsampling an image using nearest-neighbor interpolation and bilinear interpolation, in accordance with an embodiment of the invention.

FIG. 8 illustrates a comparison 800 of upsampling an image using nearest-neighbor interpolation and bilinear interpolation, in accordance with an embodiment of the invention. Image 801 is a 30×30 pixel and 4-bit image with intensity values 0-15. Image 802 shows a result of nearest neighbor interpolation, and is a 300×300 pixels and 4-bit image with intensity values 0-15. Image 803 shows a result of bilinear interpolation, and is a 300×300 pixels and 4-bit image with intensity values 0-15.

Figure 9:
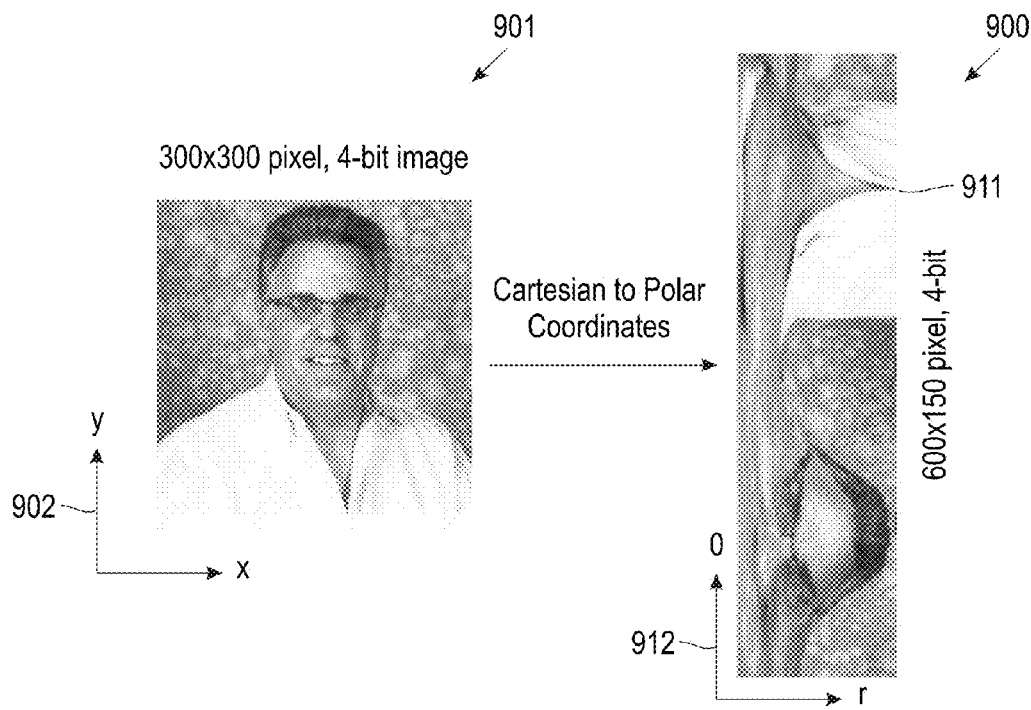
FIG. 9 illustrates an example of transforming Cartesian to polar coordinates, in accordance with an embodiment, of the invention.

FIG. 9 illustrates an example 900 of transforming Cartesian coordinates to polar coordinates, in accordance with an embodiment of the invention. Image 901 shows a 300×300 pixel and 4-bit image in Cartesian coordinates 902. Image 911 shows a 600×150 pixel and 4-bit image in polar coordinates 912. The example 900 shows how image distortion correction may be useful for non-traditional cameras in accordance of an embodiment of the invention.

Figures 10A, 10B:
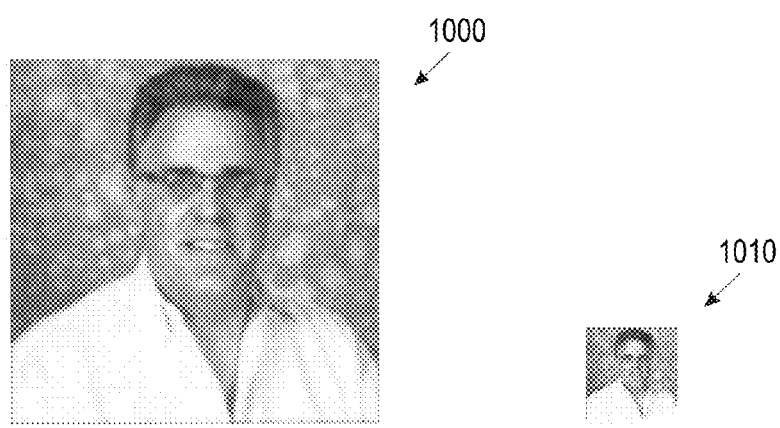
FIG. 10A illustrates an image desired to be sharpened, in accordance with an embodiment of the invention.
FIG. 10B illustrates a downsampled version of the image in FIG. 10A in accordance with an embodiment of the invention.
Figure 11A:
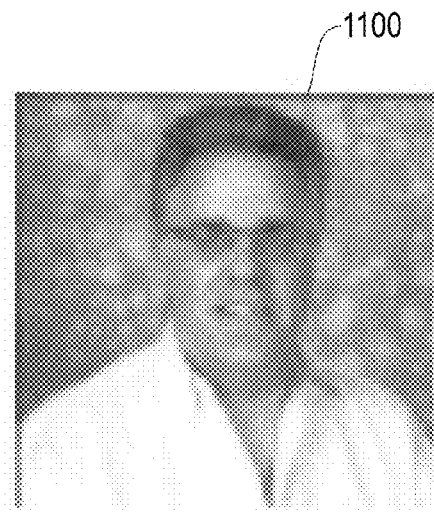
FIG. 11A illustrates an upsampled version of the image of FIG. 10B, in accordance with an embodiment of the invention.

FIG. 10A illustrates an image 1000 desired to be sharpened, in accordance with an embodiment of the invention. Image 1000 shows an 8-bit image. The following images show an example of using bilinear interpolation to sharpen an image. FIG. 10B illustrates a downsampled version 1010 of the image 1000 in accordance with an embodiment of the invention. FIG. 11A illustrates an upsampled version 1100 of the image 1010 of FIG. 10B, in accordance with an embodiment of the invention. In one embodiment, the image 1100 is a result of using spiking based bilinear interpolation using the image correction system 600 (FIG. 6).

Figure 11B:
FIG. 11B illustrates a difference image resulting from subtracting the image in FIG. 11A from the image in FIG. 10A, in accordance with an embodiment of the invention.
Figure 12A:
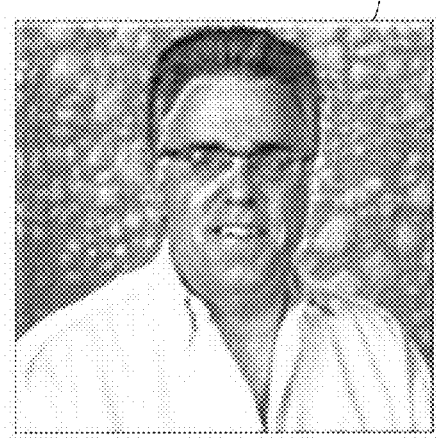
FIG. 12A illustrates a sharpened image after adding the image in FIG. 11B to the image in FIG. 10A, in accordance with an embodiment of the invention.
Figure 12B:
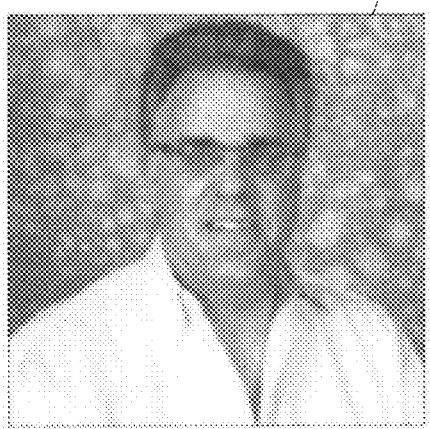
FIG. 12B illustrates a duplicate of the source image in FIG. 10A shown for comparison, in accordance with an embodiment of the invention.

FIG. 11B illustrates a difference image 1110 resulting from subtracting the image 1100 in FIG. 11A from the image 1000 in FIG. 10A, in accordance with an embodiment of the invention. FIG. 12A illustrates a sharpened image 1200 after adding the image 1110 in FIG. 11B to the image 1000 in FIG. 10A, in accordance with an embodiment of the invention. FIG. 12B illustrates a duplicate of the source image 1000 in FIG. 10A shown next to image 1200 for comparison, in accordance with an embodiment of the invention.

Figure 13:
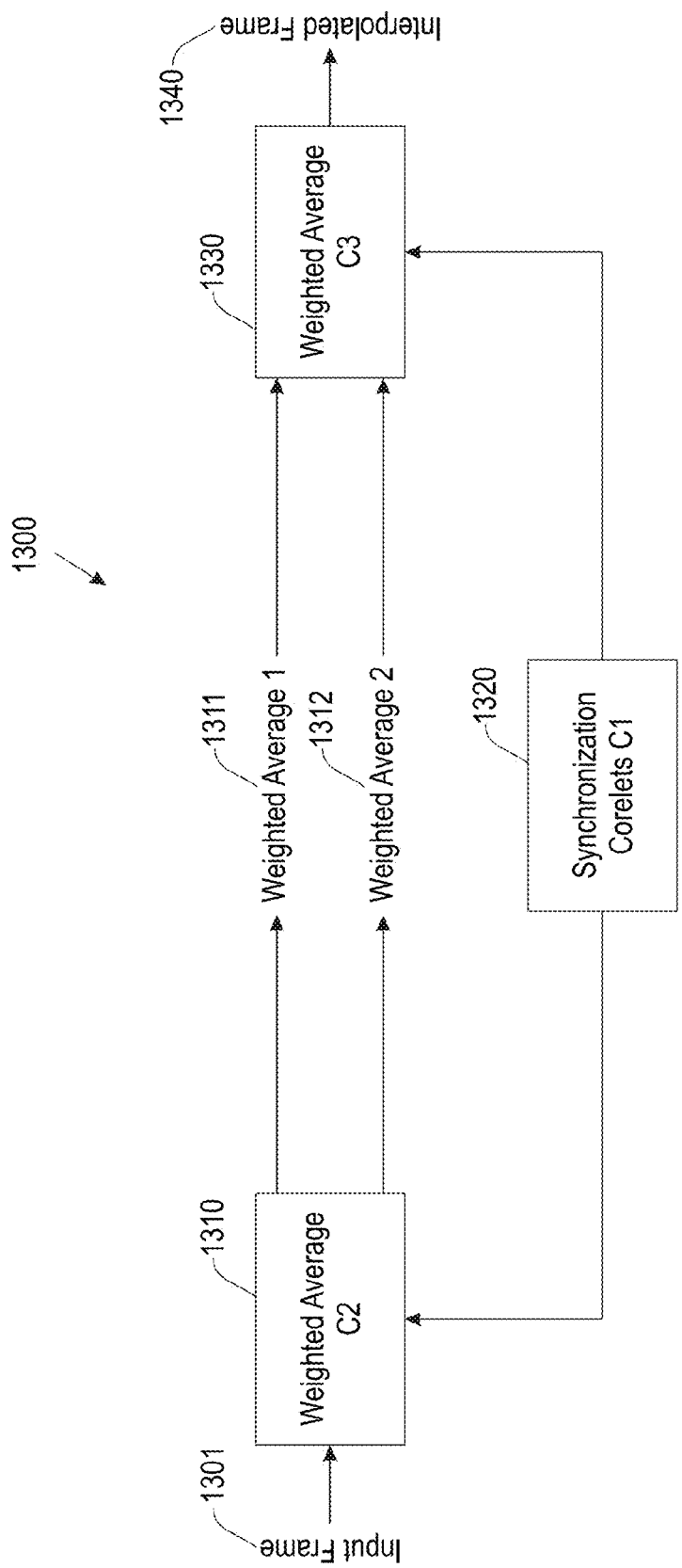
FIG. 13 illustrates an example of a block diagram showing a bilinear interpolation corelet, in accordance with an embodiment of the invention.

FIG. 13 illustrates an example of a block diagram showing a bilinear interpolation corelet system 1300, in accordance with an embodiment of the invention. In one embodiment, an implementation of bilinear interpolation may be split into three (3) main subcorelets, corelet C1 1320, corelet C2 1310, and corelet C3 1330. In one embodiment, one corelet (C1 1320) is responsible for synchronization (e.g., for biasing/rounding or resetting the appropriate neurons), one corelet (C2 1310) is responsible for the weighted sum of f(0,0) and f(0,1) (i.e., for integers $0 \leq x_1, x_2, y_1, y_2 \leq 255$, it calculates a=round($[(y_1)f(0,0)+(y_2)f(0,1)]/(y_1+y_2)$), as well as the weighted sum of f(1,0) and f(1,1) (i.e., it calculates b=round($[(y_1)f(1,0)+(y_2)f(1,1)]/(y_1+y_2)$)), and then one corelet (C3 1330) is responsible for calculating f($x_2/(x_1+x_2)$), $y_2/(y_1+y_2)$)≈round($[(x_1)a+(x_2)b]/(x_1+x_2)$), where round( ) denotes the rounding operator. In one embodiment, for the system 1300, an input frame 1301 is received by the system 1300, and after processing, the interpolated frame 1340 is output.

In one example embodiment, due to a maximum of four (4) axon types per core, and two axons are used for biasing and resetting the above described calculations in each core, a maximum of two (2) axon types remain for each of C2 1310 and C3 1330. In one example embodiment, the system 1300 architecture is used to implement bilinear interpolation, which splits the interpolation in two stages by calculating the weighted averages along the y-axis (weighted average 1 1311) followed by the weighted averages along the x axis (weighted averages 2 1312) of the two previous results.

In one embodiment, the corelet system 1300 performs image transformation from a grayscale/single channel source image S to a grayscale/single channel destination image D (S comprises m×n pixels, wherein S is denoted by a function S: {1 to m}×{1 to n}→{0 to N}), and D comprises p×q pixels, wherein D is denoted by function D: {1 to p}×{1 to q}→{0 to N}, wherein m, n, p and q are positive integers equal to or greater than 1, and N is a positive integer) subject to a user specified function f: {1 to p}×{1 to q}×I→{0 to N} satisfying f(x, y, S)=D(x, y) for all x, y, where I denotes the set of all possible m×n grayscale input images. In one embodiment, the user specified function takes as input a sequence of image frames of a video with one or more channels per frame, representing the intensity of each pixel of each channel of each frame as neural spikes, and implementing a form of bilinear interpolation where a neural spike representation of each output pixel of D is equivalent to a result of a convex combination of multiple (e.g., four) pixel intensities from S with neighboring pixel coordinates.

In one embodiment, the neural spike representation of each output pixel of D is equivalent to the result up to a rounding ambiguity. In one embodiment, the corelet system 1300 uses periodically spiking neurons that provide periodic spikes that are distributed across a number of axon lines in the corelet system 1300, and also comprise control signals for synchronizing a subset of the neurons by: resetting neurons to a pre-specified membrane potential value at regular intervals, biasing the membrane potential of the neurons at regular intervals, and probing the neurons to force the neurons to output a result that corresponds to a function of all respective input spikes for the current frame.

In one embodiment, the corelet system uses neurosynaptic or non-neurosynaptic circuits for converting each pixel of each channel of each input frame to neural spikes using one of the following temporal coding schemes: a rate code, wherein intensity of a pixel is proportional to a number of spikes that are sent to one or more input lines of the pixel in a specified time window or a stochastic code, where the intensity of a pixel determines a probability of a spike being sent to one or more pixel input lines each time step. In one embodiment, a specific mapping of intensity to spike count is linear or non-linear. In one embodiment, one of the following spatial coding schemes is used: a single line code, where spikes for a pixel intensity are sent to a single input line, or a population code, where spikes encoding a pixel intensity are delivered across multiple input lines, where each line is assigned to encode values having different sign and/or amplitude. In one example embodiment, four lines might be used with values of −8, 1, 2 and 4 to provide binary composition of integer values from −8 to 7.

In one embodiment, the corelet system 1300 comprises a finite number of cores, where each core (e.g., corelet C1 1320, C2 1310 and C3 1330) includes a binary crossbar with a finite number of input axons and output neurons. In one embodiment, each of the input axons in a core is associated with one of K possible axon types, wherein K is a positive integer. In one embodiment, each neuron in a core accepts input spikes from any subset of the input axons of the core. In one embodiment, for each crossbar-connected neuron and axon pair a synaptic weight is assigned in a preselected range (e.g., −W, ..., 0, ..., W, where W is an integer), where for any two axons with identical axon type, that are connected to the same neuron, then a same synaptic weight from the preselected range is associated with the axon lines and the neuron.

In one embodiment (FIGS. 10, 11 and 12), the corelet system 1300 is a submodule of an image sharpening routine that converts S to a sharpened D by taking as input a sequence of image frames of a video with one or more channels per frame, and representing the intensity of each pixel of each channel of each frame as neural spikes, and processing S to obtain the sharpened D for a particular frame and channel that enhances high frequency components of the source image. In one embodiment, either nearest-neighbor or bilinear interpolation is performed during the image sharpening. In one embodiment, neural spike representations of D are processed for outputting a spike representation of the sharpened D. In one embodiment, bilinear interpolation involves taking from an intermediate representation of S, convex combinations of four pixel intensities with neighboring pixel coordinates.

In one embodiment, the transducer unit 610 (FIG. 6) receives an input video or image, and pre-processes the input for image correction by the corelet 620. As described in detail later herein, the transducer unit 610 converts each pixel of each image frame of the input video or image to one or more neuronal firing events.

In one embodiment, the corelet 620 is an example complex corelet 160 comprising multiple corelets 100. The image correction system 600 utilizes the corelet 620 for image correction (or inverse distortion). The image correction system 600 further utilizes the corelet 620 to encode the output as neuronal firing events, and for in camera or image sensor image correction. In one embodiment, the synchronization unit 630 generates periodic control pulses for synchronizing the corelets 100 of the corelet 620.

In one embodiment, the number of frames/second depends on a number of parameters such as the distortion coefficients, the way the pixel intensities that are sent to the image correction system 600 are encoded, the image size, and the maximum number of neurons (e.g., neurons 11, FIG. 1) that are desired to use. In one embodiment, if there is no limit on the number of neurons that are desired to use, it is possible to correct distorted video at up to 1000 frames per second (although this may be expensive in terms of the number of neurons/cores used). Additionally, the more neurons/cores used, the more expensive the system may be in terms of the power requirements, which results in a tradeoff.

The following describes different scenarios illustrating how the image correction system 600 works in practice and how the system parameters affect the system efficiency according to one or more embodiments. In one example embodiment, for an input video sequence consisting of 300×300 pixels greyscale or Bayer patterned color frames, where each pixel is encoded using 8 bits (values 0-255), one embodiment for an encoding scheme involves using four (4) axon (e.g., axons 15, FIG. 1) types on the corelet 620, where the axon types represent weights of 1, 4, 16, and 64, respectively. In one example embodiment, consider a particular pixel "p" whose intensity "v" it is desired to encode. In one example embodiment, if $0 \leq c_i \leq 3$ denotes the number of spikes entering the $i^{th}$ axon type of pixel p, then any value $0 \leq v \leq 255$ within 3 ticks/milliseconds may be uniquely encoded since there exist values for $c_1, c_2, c_3, c_4$ such that $v = 1*c_1 + 4*c_2 + 16*c_3 + 64*c_4$. In one example embodiment, for each undistorted pixel coordinate (x, y), where $0 \leq x \leq 300$, $0 \leq y \leq 300$, the corelet 620 estimates the closest pixel coordinate (x', y') in the distorted image plane that pixel (x, y) would map to, and creates a network for routing the corresponding intensity values $c_1, c_2, c_3, c_4$, of pixel (x', y') to output pixel (x, y).

In one example embodiment, this results in at most 1400 cores (e.g., cores 10, FIG. 2) being used (about ⅓ of a neurosynaptic network circuit 60 or TrueNorth IC) and achieves about 330 frames per second, since each frame is routed within 3 ms (since $0 \leq c_i \leq 3$) and the neurosynaptic network circuit 60 or TrueNorth IC using corelets 620 processes at most 1000 spikes per second. Similarly in another example embodiment, if another encoding scheme is used which is based on only two weights of 1 and 16, then at most 700 cores (about ⅙ of a neurosynaptic network circuit 60 or TrueNorth IC) is required and would achieve a maximum of 66 frames per second (each frame is routed within 15 ms since $0 \leq c_i \leq 15$).

In one embodiment, in terms of the power usage, and assuming each neurosynaptic network circuit 60 or TrueNorth IC uses at most an estimated 0.05 W, then the two above example embodiment schemes would roughly require 0.017 W and 0.0085 W respectively (assuming that there is no leakage associated with the unused cores on a neurosynaptic network circuit 60 or TrueNorth IC). This does not include the cost of sending spikes inside the neurosynaptic network circuit 60 or TrueNorth IC and storing the output.

Figures 14A, 14B, 14C:
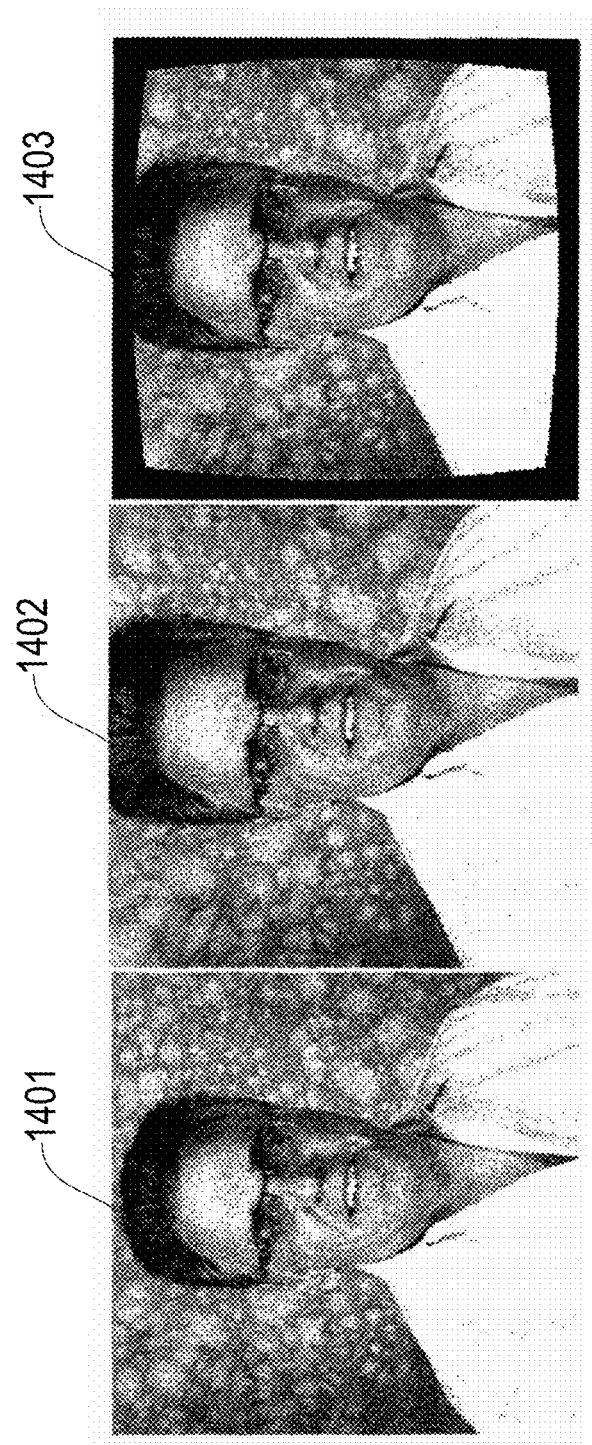
FIG. 14A illustrates an example undistorted image.
FIG. 14B illustrates an example distorted image of the image shown in FIG. 14A.
FIG. 14C illustrates an example of a corrected image based on using the image distortion correction system of FIG. 6, in accordance with an embodiment of the invention.

FIG. 14A shows an example of an original image 1401. FIG. 14B shows an example of a distorted image 1402 based on a lens (e.g., inexpensive lens) of an image capturing device or camera device. FIG. 14C shows a resulting undistorted image 1403 as a result of using an embodiment of the invention using a corelet 620 of a neurosynaptic network circuit 60 or TrueNorth IC (or simulator) for removing distortion in an image capturing device or camera device.

In one embodiment, the example distorted image 1402 shown in FIG. 14B was processed using a single input axon per pixel (a weight of 1) resulting in 352 cores being used, since only a single neuron is needed to route each pixel intensity. Note that in the undistorted image 1403 in FIG. 14C, no neurons are used for the black pixels, since nothing needs to be routed for these pixels, demonstrating how the deformation parameters affect the number of neurons that the system requires according to one embodiment.

Figure 15:
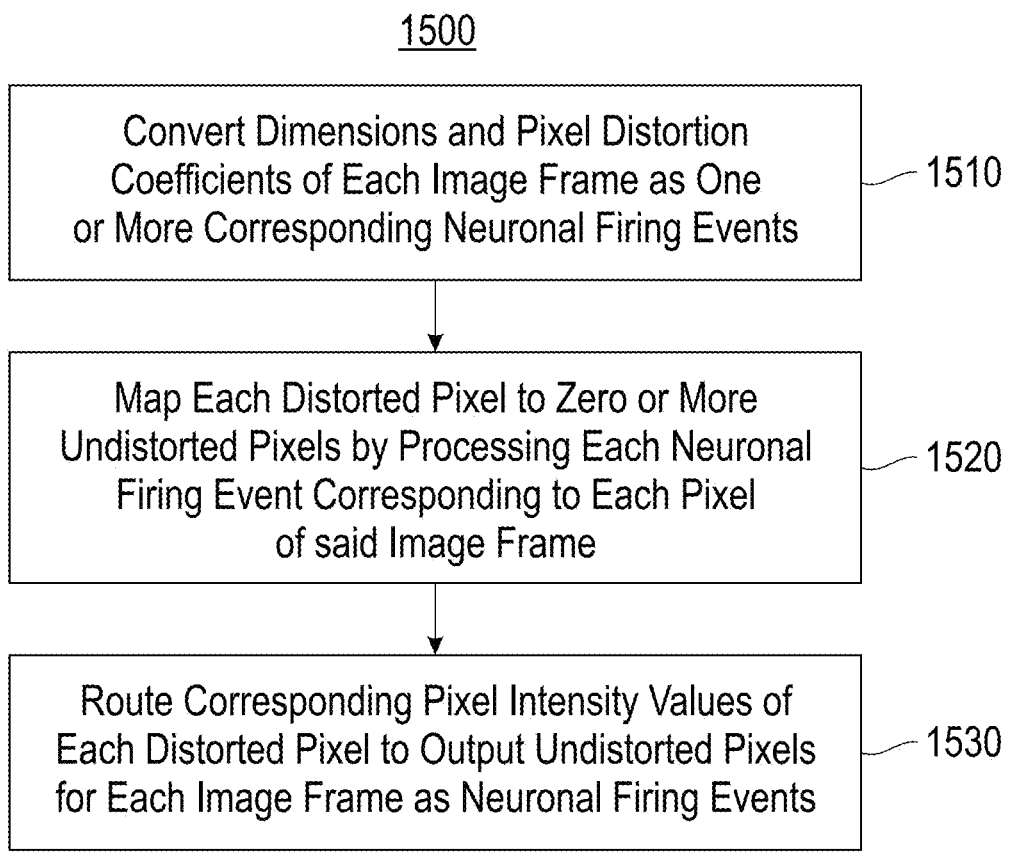
FIG. 15 illustrates a flowchart of an example process used for image distortion correction, in accordance with an embodiment of the invention.

FIG. 15 illustrates a flowchart of an example process 1500 for image distortion correction, according to one embodiment of the invention. In one embodiment, in block 1510, dimensions and pixel distortion coefficients of each image frame are converted as one or more corresponding neuronal firing events. In one embodiment, in block 1520, each distorted pixel is mapped to zero or more undistorted pixels by processing each neuronal firing event corresponding to each pixel of said image frame. In one embodiment, in block 1530, corresponding pixel intensity values of each distorted pixel are routed to output undistorted pixels for each image frame as neuronal firing events.

In one embodiment, process 1500 utilizes multiple neurosynaptic core circuits for image distortion correction using dimensions and pixel distortion coefficients of each image frame as input, wherein each core circuit comprises multiple electronic neurons, multiple electronic axons, and a plurality of electronic synapse devices for interconnecting said multiple neurons with said multiple axons. In one embodiment, each neuron of each core circuit is a periodically spiking neuron that distributes neuronal firing events across said multiple core circuits to enable synchronization of one or more operations. In another embodiment, a subset of neurons may spike periodically for synchronization purposes. In one embodiment, for a bilinear interpolation corelet, an alternative higher quality approach to sub-pixel interpolation is provided by using periodic synchronization neurons. In one embodiment, synchronization neurons are useful if it is desired to include a neural preprocessing module in front of the camera that requires synchronization.

In one embodiment, process 1500 further includes using a pixel distortion model for determining the pixel distortion coefficients of each image frame. In one embodiment, a pixel encoding scheme is selected for encoding the pixels of each image frame, and encoded pixels of each image frame are routed to the multiple neurosynaptic core circuits. In one embodiment, the selected pixel encoding scheme is based on a number of spikes entering a particular axon type.

In one embodiment, the mapping in block 1520 may comprise a corelet of multiple neurosynaptic core circuits estimating a closest pixel coordinate (x', y') in a distorted image plane that a pixel (x, y) maps to, and creating a neurosynaptic network within the multiple neurosynaptic core circuits for routing corresponding intensity values of pixel (x', y') to output pixel (x, y).

In one embodiment, in process 1500 a number of frames/second processed by the multiple neurosynaptic core circuits depends on one or more of: a selected pixel encoding scheme, distortion coefficients, image size, and a selected maximum number of neurons used. In one embodiment, no routing is performed and no neurons are used for black pixels.

Figure 16:
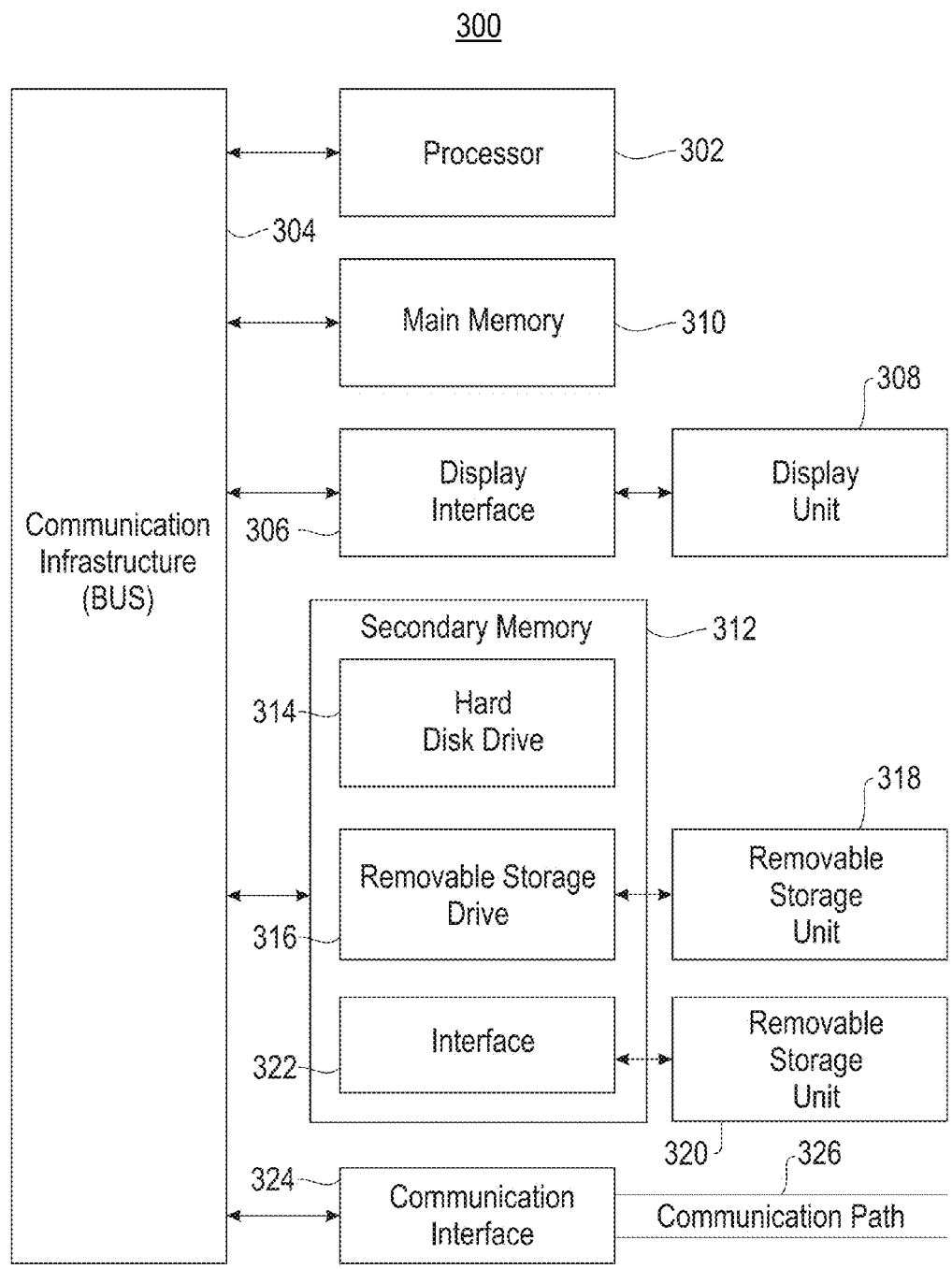
FIG. 16 is a high level block diagram showing an information processing system useful for implementing one embodiment of the present invention.

FIG. 16 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system may include a display interface 306 that forwards graphics, text, and other data from the communication infrastructure 304 (or from a frame buffer not shown) for display on a display unit 308. The computer system may also include a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neurosynaptic circuit comprising:
a plurality of neurosynaptic core circuits that:
perform image transformation from a source image to a destination image subject to a user specified function that comprises:
taking as input a sequence of image frames of a video with one or more channels per frame, and representing the intensity of each pixel of each channel of each frame as neural spikes; and implementing interpolation wherein a neural spike representation of intensity of each output pixel of each output channel of the destination image, is dependent on a result of a convex combination of a multiple pixel intensities from some neighborhood of source image pixels.

2. The circuit of claim 1, wherein the user specified function is a one-to-many mapping of each pixel of each channel in the output image, to a set of coordinates in the source image, specifying how each pixel coordinate of the output image is distorted or deformed with respect to the input image.

3. The circuit of claim 2, wherein the mapping is used to associate with each output pixel coordinate, a neighborhood of input image pixel intensities that is used by the convex combination of the multiple pixel intensities on which the interpolation depends.

4. The circuit of claim 3, wherein the neural spike representation of each output pixel of the destination image is equivalent to the result of the convex combination of the multiple pixel intensities, up to a rounding ambiguity.

5. The circuit of claim 4, wherein the multiple pixel intensities from the source image comprises at most four pixel intensities per output pixel coordinate and per output channel.

6. The circuit of claim 5, wherein the plurality of neurosynaptic core circuits use periodically spiking neurons that provide periodic spikes that are distributed across a number of axon lines in the neurosynaptic circuit, and are also control signals for synchronizing a subset of the neurons by:

resetting neurons to a pre-specified membrane potential value at regular intervals;

biasing the membrane potential of the neurons at regular intervals; and probing the neurons to force the neurons to output a result that corresponds to a function of all respective input spikes for the current frame.

7. The circuit of claim 6, wherein circuit comprises a neurosynaptic or non-neurosynaptic component for converting each pixel of each channel of each input frame to neural spikes using one of the following temporal coding schemes:

a rate code, wherein intensity of a pixel is proportional to a number of spikes that are sent to one or more input lines of the pixel in a specified time window and;

a stochastic code, wherein the intensity of a pixel determines a probability of a spike being sent to one or more pixel input lines each time step, wherein a specific mapping of intensity to spike count is linear or non-linear; and one of the following spatial coding schemes:

a single line code, wherein spikes for a pixel intensity are sent to a single input line; and a population code, wherein spikes encoding a pixel intensity are delivered across multiple input lines, wherein each line is assigned to encode values having different sign and/or amplitude.

8. The circuit of claim 7, wherein the neurosynaptic circuit comprises a finite number of cores, where each core includes a binary crossbar with a finite number of input axons and output neurons; where each of the input axons in a core is associated with one of K possible axon types, wherein K is a positive integer, wherein each neuron in a core accepts input spikes from any subset of the input axons of the core;

wherein for each cross-bar connected neuron and axon pair, a synaptic weight is assigned in a preselected range;

wherein for any two axons with identical axon type, that are connected to a same neuron, then a same synaptic weight from the preselected range is associated with the axon lines and the neuron.

* * * * *